Feb. 29, 1944.  F. J. LINGEL  2,342,947
ELECTRICAL MEASURING DEVICE
Original Filed Aug. 11, 1941
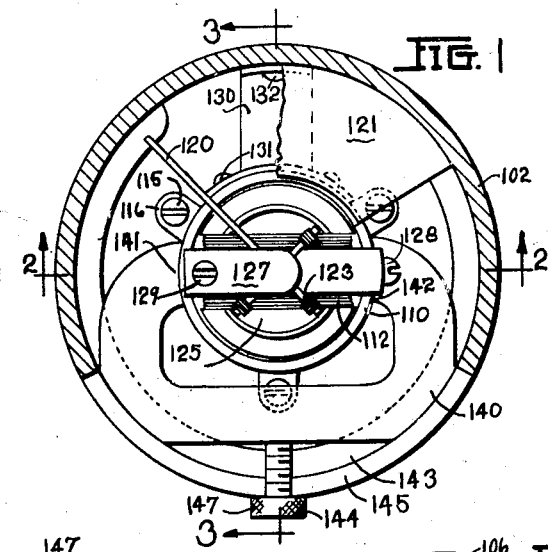
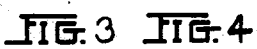
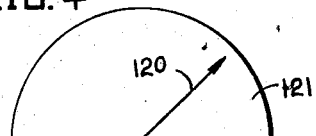
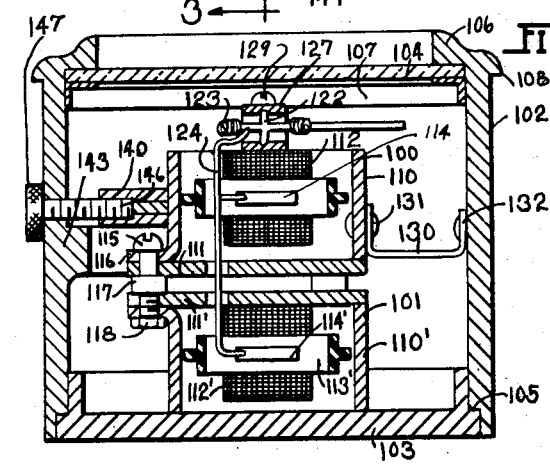
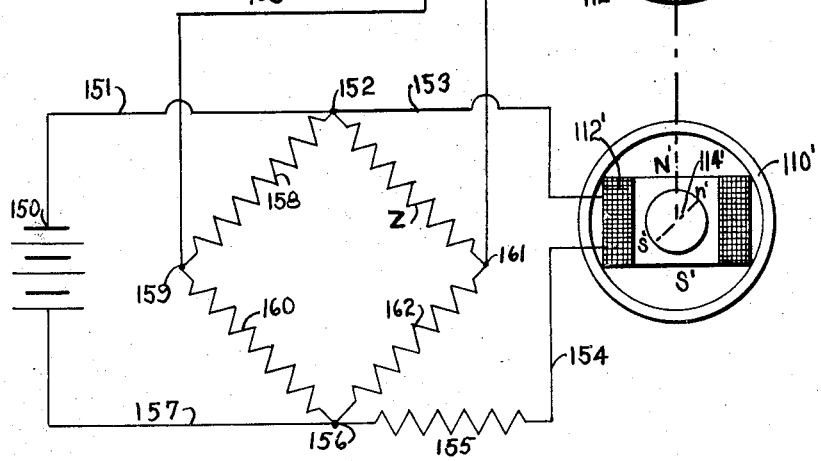
Inventor
FREDERICK J. LINGEL
by Toulmin & Toulmin
Att'y.

Patented Feb. 29, 1944

2,342,947

UNITED STATES PATENT OFFICE 2,342,947

ELECTRICAL MEASURING DEVICE

Frederick J. Lingel, Bluffton, Ohio, assignor to The Triplett Electrical Instrument Company, Bluffton, Ohio, a corporation of Ohio Original application August 11, 1941, Serial No. 406,336. Divided and this application March 6, 1942, Serial No. 433,568

8 Claims. (Cl. 171—95)

The present invention relates to electrical measuring devices and particularly to meters such as an ohm meter for determining the ratio between two currents or two voltages, etc.

This is a divisional application of my copending application Serial No. 406,336, filed August 11, 1941.

The primary object of the present invention is to provide an improved measuring device for determining the ratio between two currents.

Another object is to provide an ohm meter in which the variations of the actuating electromotive force are utilized at the meter and do not affect the indications of the instrument.

Still another object is to provide a current ratio meter employing two coils, through which the respective currents are caused to flow, and subjecting one of the coils to a magnetic field of constant value and the other of the coils to a magnetic field of progressively increasing value as the current through that coil is increased.

The general object of the invention is to provide an improved meter for giving an accurate direct reading of two or more current or voltage values in terms of their ratios, notwithstanding variations in the electromotive force which energizes the instrument.

Figure 1 is a plan view partly in section of the improved ratio meter;

Figure 2 is a section on line 2—2 of Figure 1;

Figure 3 is a section on line 3—3 of Figure 1;

Figure 4 is a diagrammatic view of the ratio meter shown in Figure 1 connected in a bridge circuit.

The moving system of the usual type of D'Arsonval indicating electrical instrument is caused to deflect under the influence of a torque exerted thereon by current flowing through a coil suspended between the pole faces of a permanent magnet. The deflection is limited and the moving system comes to rest at a point where the restoring torque is equal and opposite to the deflecting torque. This restoring torque is usually applied to the moving system through a spiral torsion spring, which spring exerts a mechanical bias in direct proportion to the deflection. In many places where an electrical instrument of the indicating type could be used, the power supply is not a constant voltage. Such application includes aircraft and automotive installation and many others where the source of power consists of a battery or generator. The voltage applied to the electrical circuit in such a system is subject to numerous influences tending to cause it to vary. For instance, both the battery and generator voltages are functions of the rate at which they are supplying power. The battery voltage is further affected by the amount it has been discharged. The generator voltage is also a function of its speed and would vary with the speed of its prime mover.

The above discussion as regards the introduction of errors by voltage fluctuation is also applicable to a moving vane type instrument in which the torque is exerted on the moving system by the interaction of a magnetic field set up in a coil by a current flowing through the same, and an iron vane rotatably suspended in the field of the coil. In this case, the vane may be either permanently magnetized or not. In either case the net effect of a voltage fluctuation is to cause the magnetic field to fluctuate and the reaction of the vane thereon to fluctuate. The fluctuating force exerted on the vane is opposed by a steady torsional force from the spiral spring and the moving system is, therefore, not at rest. Any measuring device, therefore, based on the voltage of a battery or generator balanced against the mechanical bias of a torsional spring will be in error by at least the same amount as the voltage.

Referring now to the drawing, Figures 1, 2, 3 and 4 show my improved ratio meter in which two vane type movements, generally indicated 100 and 101, are mounted in axial alignment within a nonmagnetic case 102. The case 102 is fitted with a bottom closure disc 103 and a transparent cover 104. The closure disc 103 is shouldered as at 105 and is retained in position by screws (not shown). A reduced diameter portion 106 at the upper edge of case 102 provides a ledge against which the transparent cover 104 is retained by a ring 107. An external flange 108, on the upper edge of case 102, is provided as a mounting ledge to facilitate mounting the instrument in a panel.

The movements proper comprise cylindrical sleeves 110 and 110' of magnetic material, end closures 111 and 111' of magnetic material, and coils 112 and 112' wound on nonconducting bobbins 113 and 113' and permanently magnetized circular vanes 114 and 114'. The vanes 114 and 114' are of any magnetic material of a sufficiently high coercive force that they may be strongly and permanently magnetized. The sleeves 110 and 110' and the end closures 111 and 111' are provided with ears 116 through which screws 115 are inserted. Spacing collars 117 hold the movements in spaced relation and nuts 118 serves to clamp both units together.

A pointer 120 is arranged to swing over a dial 121. Pointer 120 is a portion of an assembly comprising in addition to the pointer a short shaft 122, counterweights 123, and a stiff nonmagnetic wire bail 124. The counterweights are adjustable radially relative to the shaft and serve to balance the moving system. The bail 124 is adapted to swing in the open space indicated at 125 in Figure 1 and is so formed as to engage vanes 114 and 114'. Vanes 114 and 114' are supported by bail 124 in concentric alignment in the shaft 122 and in the centers of coils 112 and 112', respectively. Shaft 122 is pivoted as at 126 in the bent strip 127. Strip 127 is made of a material which is both resilient and possessed of good bearing qualities, such as phosphor, bronze, or the like. The strip is bent to the shape seen in Figure 2 and is engaged by a screw 128 which holds it securely in place on sleeve 110. The portion of strip 127 which extends across sleeve 110 is bent into a U shape and encloses shaft 122 as seen in Figures 2 and 3. Screw 129 provides a ready means for adjusting the pressure or taking up play at the bearing points 126.

As shown in the drawing, coil 112 is cemented or otherwise suitably affixed to the under side of strip 127 but it is understood that other ways of mounting this coil are possible. For instance, the bobbin 113 could be fashioned so as to be fastened to the sleeve 110. In the movement 101 the coil 112' is shown cemented to the plate 111' but it will be understood that the foregoing remarks regarding the mounting of coil 112 will apply to coil 112' also.

The assembly comprising movements 100, 101, together with the moving system is mounted and aligned within the case 102 by a strap 130 fastened as at 131 to sleeve 110 and as at 132 to case 102.

In addition to the parts thus far described a permanent magnet 140 is arranged within the case 102. This substantially C shaped laminated magnet is disposed within the case so that the pole faces thereof are diametrically presented to sleeve 110 as at 141, 142. The edge of the magnet adjacent the case rests on a ledge 143 and is locked in position by a screw 144 extending through slot 145. Screw 144 is threaded into the magnet as at 146 and has a head 147 which bears against the outer surface of the case 102. The purpose of magnet 140 is to set up a weak magnetic field across the diameter of sleeve 110. This field links with vane 114 and gently urges it into the position shown in Figure 4. In this manner, a restoring force is always present in the moving system urging it towards an idle position. This force is small enough that it does not appreciably affect the indication of the instrument but is sufficient to swing the movement off scale when there is no current through coils 112 and 112'. An observer is thus notified of a battery failure or an open circuit.

In Figure 4 this instrument is shown connected into a Wheatstone bridge circuit in which 150 is a battery of any well known type. From battery 150 a wire 151 is connected to point 152. A wire 153 connects one terminal of coil 112' with point 152. The other terminal of coil 112' is connected through wire 154 to one end of resistor 155. The other end of resistor 155 is connected to point 156 and thence through a wire 157 back to the battery. A circuit also exists from the battery through wire 151 to point 152, through resistor 158 to a point 159, thence through resistor 160 to point 156, and back to the battery through wire 157. There is another circuit from the battery through wire 151 to point 152, through unknown resistor Z to a point 161, thence through resistor 162 to point 156 and back to the battery through wire 157.

In Figure 4 the instrument is shown as being deflected to the right of center and the magnetic axes of the vanes 114 and 114' are shown by dotted lines and marked $n$, $s$, and $n'$, $s'$, respectively. The magnetic poles of the coils are marked N, S and the magnetic poles of the permanent magnet are marked P$n$, P$s$. This system of notation is only representative and either of the vane, coil units could be of reversed polarity without affecting the operation.

The operation is as follows. An unknown resistor Z has been inserted in the circuit between points 152 and 161. According to the well known principle of the Wheatstone bridge, if Z is not of a value which will balance the bridge, a difference of potential will exist between points 159, 161 and current will flow through coil 112. This current will set up a magnet field N—S through coil 112 of a strength proportional to the current through 112. The vane 114 is then urged to rotate away from its rest position. The torque urging vane 114 to rotate will diminish as the axis $n$, $s$ of the vane rotates towards the axis N, S of coil 112. Now the vane 114' is caused to rotate as vane 114 rotates by the mechanical connection between them. The magnetic axis $n'$, $s'$ of vane 114' then rotates away from the magnetic axis N', S' of the coil 112'. This sets up a torque urging vane 114' back towards its rest position. This torque will increase as the axis $n'$, $s'$ of vane 114' rotates away from the axis N', S' of coil 112'.

The moving system will continue to deflect until the diminishing torque on vane 114 is balanced by the increasing torque on vane 114'. The instrument will deflect to the right for, say, values greater than Z and to the left for values smaller than Z.

The amount of deflection for a given change in value of the unknown resistor is a measure of the resistor 155. The greater the resistor 155 the greater the deflection, since the restoring torque of vane 114' would be reduced. Hence, the sensitivity of the instrument depends on the value of 155. If now the voltage of battery 150 fluctuates during the operation of the instrument it will be seen that the change in the currents through coils 112 and 112' will be in the same proportion. The magnetic fields will therefore vary in the same proportions and the deflection of the instrument is unchanged. This instrument therefore indicates the true value of an unknown resistance and is not responsive to voltage fluctuation in the power supply.

A vane movement of the type described above comprising only one vane and one coil, shield, and a permanent magnet mounted as at 140 would be useful as an ammeter or voltmeter in a direct current circuit. The sensitivity of such a voltmeter or ammeter would depend on the strength of the magnet 140. The stronger the magnet the less the sensitivity, and the weaker the magnet the greater the sensitivity. The zero point of the instrument would be adjusted by shifting magnet 140 about the center. An instrument of this type is inexpensive to manufacture, accurate and rugged.

It will be understood that I desire to comprehend within my invention such modifications as come within the scope of the claims and the invention.

Having thus fully described my invention, what I claim as new and desire to secure by Letters Patent, is:

1. A meter for determining the ratio between two currents, said meter comprising a casing containing a pair of coils to which the respective currents are applied, a rotative element in each coil and responsive to the magnetic fields set up in the respective coils, said elements being secured together and carrying a pointer which takes a position depending on the ratio of the currents traversing said coils, and a permanent magnet in magnetic relation with respect to one of said coils, and means to adjust said magnet angularly about the center of said coil to swing the movement of the pointer off scale when there is no current through said coil.

2. A meter for determining the ratio between two currents, said meter comprising a casing containing a pair of coils to which the respective currents are applied, a rotative element in each coil and responsive to the magnetic fields set up in the respective coils, said elements being secured together and carrying a pointer which takes a position depending on the ratio of the currents traversing said coils, and a permanent magnet in magnetic relation with respect to one of said coils, said permanent magnet being adjustable angularly about the center of said coil from the exterior of said casing to adjust the position of the pointer when at rest and no current is flowing through said coil.

3. A meter for determining the ratio between two currents, said meter comprising a casing containing a pair of coils to which the respective currents are applied in opposition, a rotative element in each coil and responsive to the magnetic fields set up in the respective coils, said elements being secured together and carrying a pointer which takes a position depending on the ratio of the currents traversing said coils, said coils being positioned directly over one another and said rotative elements comprising members of highly magnetizable material, and a permanent magnet positioned adjacent one of said coils and adapted to be moved angularly about the center of said coil to adjust the position of the pointer when at rest and no current is flowing through said coil in order to adjust the effects of the two coils on one another.

4. A meter for determining the ratio between two currents, said meter comprising a casing containing a pair of coils to which the respective currents are applied in opposition, a rotative element in each coil and responsive to the magnetic fields set up in the respective coils, said elements being secured together and carrying a pointer which takes a position depending on the ratio of the currents traversing said coils, said coils being positioned directly over one another and said rotative elements comprising members of highly magnetizable material, a magnetic casing surrounding each of said coils, and a permanent magnet positioned adjacent one of said magnetic casings, poles of said magnet being presented to said casing whereby to influence the position of the rotative element.

5. A meter for determining the ratio between two currents, said meter comprising a casing containing a pair of coils to which the respective currents are applied in opposition, a rotative element in each coil and responsive to the magnetic fields set up in the respective coils, said elements being secured together and carrying a pointer which takes a position depending on the ratio of the currents traversing said coils, said coils being positioned directly over one another and said rotative elements comprising members of highly magnetizable material, a magnetic casing around each of said coils, and a permanent magnet positioned adjacent one of said magnetic casings, said permanent magnet being adapted to be moved with respect to each of said magnetic casings, poles of said magnet being presented to said casing whereby to influence the position of the rotative element.

6. A meter for determining the ratio between two currents, said meter comprising a casing containing a pair of coils to which the respective currents are applied in opposition, a rotative element in each coil and responsive to the magnetic fields set up in the respective coils, said elements being secured together and carrying a pointer which takes a position depending on the ratio of the currents traversing said coils, said coils being positioned directly over one another and said rotative elements comprising members of highly magnetizable material, a magnetic sleeve surrounding each of said coils, a permanent magnet of C-shape enclosed within the first mentioned casing and having the pole faces thereof diametrically presented to opposite sides of the sleeve surrounding one of said coils, and means for rotary adjustment of said magnet relative to the center of said sleeve and coil.

7. A meter for determining the ratio between two currents, said meter comprising a casing containing a pair of coils to which the respective currents are applied in opposition, a rotative element in each coil and responsive to the magnetic fields set up in the respective coils, said elements being secured together and carrying a pointer which takes a position depending on the ratio of the currents traversing said coils, said coils being positioned directly over one another and said rotative elements comprising members of highly magnetizable material, a magnetic sleeve surrounding each of said coils, a permanent magnet of C-shape enclosed within the first mentioned casing and having the pole faces thereof diametrically presented to opposite sides of the sleeve surrounding one of said coils, and a screw extending through a slot in the casing and threaded to the magnet to effect rotary adjustment of said permanent magnet.

8. A meter for determining the ratio between two currents, said meter comprising a casing containing a pair of coils to which the respective currents are applied in opposition, a rotative element in each coil and responsive to the magnetic fields set up in the respective coils, said elements being secured together and carrying a pointer which takes a position depending on the ratio of the currents traversing said coils, said coils being positioned directly over one another and said rotative elements comprising members of highly magnetizable material, a magnetic sleeve surrounding each of said coils, a permanent magnet enclosed within the first-mentioned casing and having pole faces presented to portions of the sleeve surrounding one of said coils, and means for adjustment of said magnet relative to said sleeve.

FREDERICK J. LINGEL.